(12) United States Patent
Yokoyama et al.

(10) Patent No.: US 8,346,436 B2
(45) Date of Patent: Jan. 1, 2013

(54) DRIVING SUPPORT SYSTEM

(75) Inventors: Atsushi Yokoyama, Tokyo (JP);
Shinjiro Saito, Hitachinaka (JP);
Masatsugu Arai, Kasumigaura (JP);
Tatsuya Yoshida, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/239,073

(22) Filed: Sep. 21, 2011

(65) Prior Publication Data

US 2012/0010808 A1 Jan. 12, 2012

Related U.S. Application Data

(63) Continuation of application No. 12/195,032, filed on Aug. 20, 2008, now abandoned.

(30) Foreign Application Priority Data

Sep. 27, 2007 (JP) .................................. 2007-250401

(51) Int. Cl.
*B62D 6/00* (2006.01)
*B62D 12/00* (2006.01)
*B62D 11/00* (2006.01)
*A01B 69/00* (2006.01)
*G05D 1/00* (2006.01)

(52) U.S. Cl. .............. 701/41; 701/23; 701/28; 701/116; 701/117; 701/124; 701/519; 340/436; 340/437; 340/438; 340/439; 180/168; 180/169

(58) Field of Classification Search .................... 701/23, 701/44, 117, 208, 301, 28, 41, 116, 124, 701/519; 180/168, 169, 436–440; 340/436–440, 340/168–169
See application file for complete search history.

(56) References Cited

U.S. PATENT DOCUMENTS

| 5,483,453 | A | 1/1996 | Uemura et al. |
| 6,138,062 | A * | 10/2000 | Usami ............................ 701/23 |
| 6,169,940 | B1 | 1/2001 | Jitsukata et al. |
| 6,185,492 | B1 * | 2/2001 | Kagawa et al. ................. 701/41 |
| 6,675,094 | B2 * | 1/2004 | Russell et al. ................ 701/301 |
| 7,243,026 | B2 * | 7/2007 | Kudo ............................ 701/301 |

FOREIGN PATENT DOCUMENTS

| EP | 1 407 915 A1 | 4/2004 |
| EP | 1 538 068 A2 | 6/2005 |
| JP | 2005-324782 A | 11/2005 |

OTHER PUBLICATIONS

European Search Report dated Feb. 11, 2009 (nine (9) pages).

* cited by examiner

*Primary Examiner* — Thomas Tarcza
*Assistant Examiner* — Adam Tissot
(74) *Attorney, Agent, or Firm* — Crowell & Moring LLP

(57) ABSTRACT

A driving support system includes a lane detecting unit for detecting lanes around a vehicle, a route correcting unit for correcting a route along which the vehicle is expected to travel taking into consideration an obstacle on the route after the route has been recognized by lanes detected by the lane detecting unit, and a control unit for controlling the vehicle on the basis of the positional relation between the corrected route determined by the route correcting unit and the vehicle.

2 Claims, 9 Drawing Sheets

FIG.8A
FIG.8B
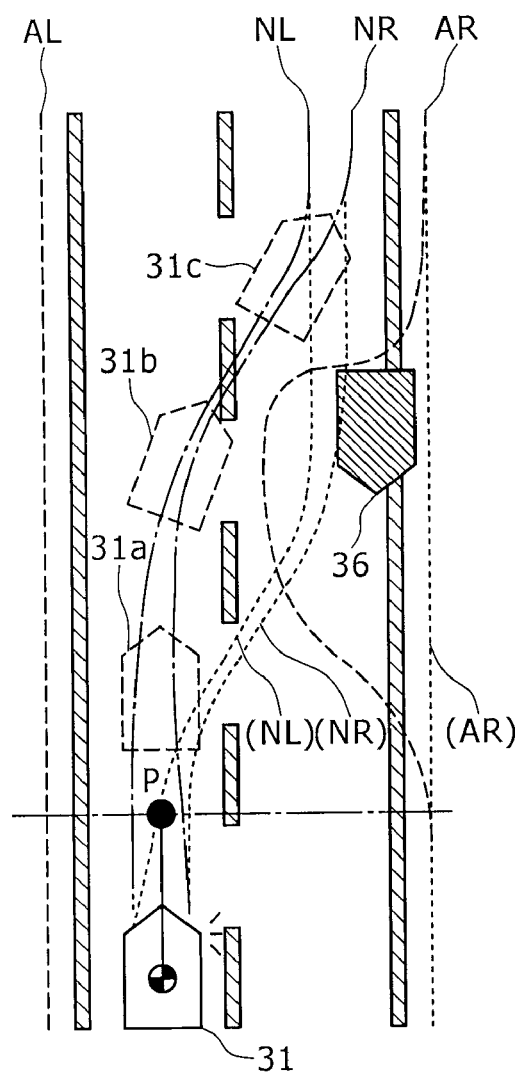
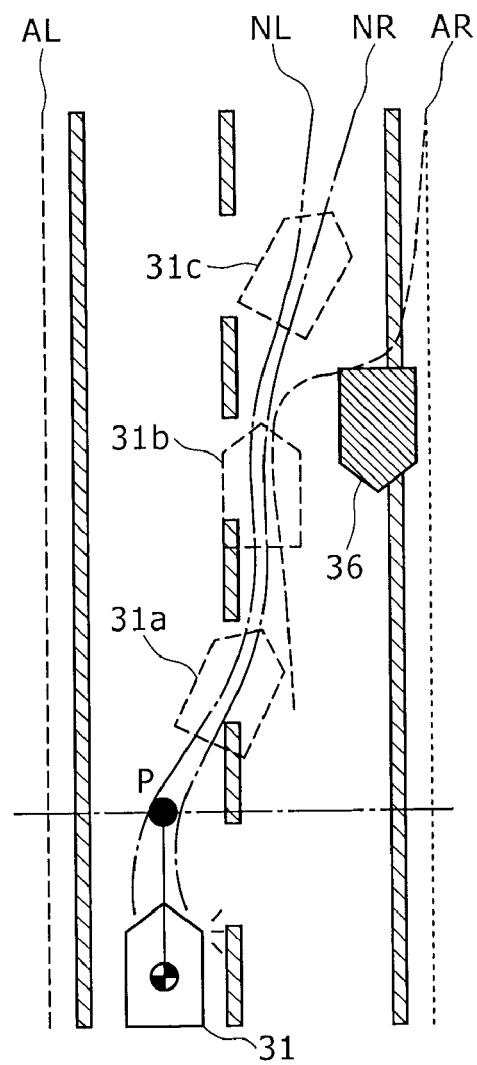

DRIVING SUPPORT SYSTEM

This application is a continuation of U.S. application Ser. No. 12/195,032, filed Aug. 20, 2008, and claims the priority of Japanese patent document 2007-250401, filed Sep. 27, 2007, the disclosure of which are expressly incorporated by reference herein.

BACKGROUND OF THE INVENTION

1. Field of the Invention

The present invention relates to a driving support system for supporting driving operations for making a vehicle travel along a proper route on a road.

2. Description of the Related Art

A technique disclosed in JP-A-2005-324782 applies a yawing moment to a vehicle when the vehicle tends to deviate from a desired lane by controlling braking forces acting on the wheels of the vehicle to prevent the vehicle from deviating from a desired lane and to notify the driver that there is the possibility that the vehicle deviates from the lane. The technique changes the value of controlled variable, such as a threshold for off-lane avoidance control, taking into consideration obstacles beside the lane to achieve optimum off-lane avoidance control.

Patent Document 1: JP-A-2005-324782

Nothing is mentioned in JP-A-2005-324782 about simultaneously carrying out supporting operations for guiding the vehicle to a desired route and for avoiding obstacles. For example, when there is an obstacle on a lane to which the vehicle is to be guided, the technique disclosed in JP-A-2005-324782 executes an obstacle avoidance operation after the vehicle has completed changing the lanes. Therefore, it is possible that the start of the obstacle avoidance operation cannot be properly timed. Only either of the threshold for off-lane avoidance control and the threshold for obstacle avoidance control is used for driving support control at some point of time and at some position. Therefore, it is possible that driving support control is not executed for avoiding an obstacle after the vehicle has deviated from the lane when the obstacle is outside the threshold for deviation avoidance control. When the driving support control is executed on the basis of the threshold for obstacle avoidance control, there is the possibility that sharp driving support control is executed to avoid an obstacle because the threshold for ordinary off-lane avoidance control is ineffective. Such a mode of driving support control gives the driver a feeling of discomfort. Thus, the technique disclosed in JP-A-2005-324782 cannot make driving support for guiding the vehicle along a desired route and driving control for avoiding obstacles compatible.

SUMMARY OF THE INVENTION

Accordingly, it is an object of the present invention to provide a driving support system capable of making driving support control for guiding a vehicle along a route and driving support control for avoiding obstacles compatible and of scarcely giving a feeling of discomfort to the driver.

A driving support system in one aspect of the present invention includes: a lane detecting unit for detecting lanes around a vehicle; a route correcting unit for correcting a route along which the vehicle is expected to travel taking into consideration an obstacle on the route after the route has been recognized by lanes detected by the lane detecting unit; and a control unit for controlling the vehicle on the basis of the positional relation between the corrected route determined by the route correcting unit and the vehicle.

The present invention provides the safe driving support system capable of making driving support control for guiding the vehicle along the route and driving support control for avoiding obstacles compatible and of scarcely giving a feeling of discomfort to the driver.

BRIEF DESCRIPTION OF THE DRAWINGS

The above and other objects, features and advantages of the present invention will become more apparent from the following description taken in connection with the accompanying drawings, in which:

FIG. 8 is a view of assistance in explaining operations to be executed when the route is changed for movement into an adjacent lane.

DESCRIPTION OF THE PREFERRED EMBODIMENTS

Preferred embodiments of the present invention will be described with reference to the accompanying drawings.

Figure 1:
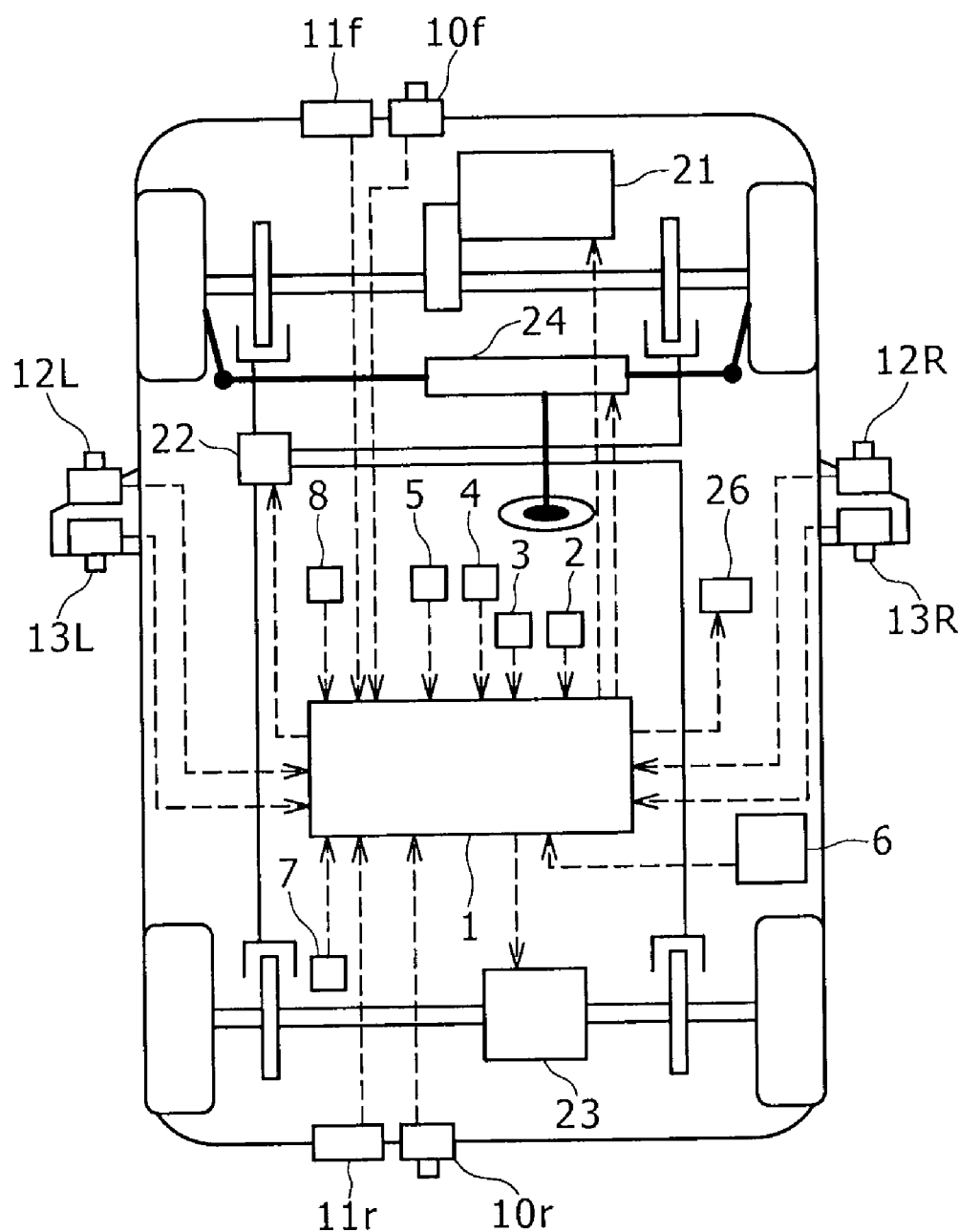
FIG. 1 is a schematic plan view of a vehicle provided with a driving support system in a preferred embodiment according to the present invention.

FIG. 1 is a schematic plan view of a vehicle provided with a driving support system in a preferred embodiment according to the present invention.

The vehicle is provided with a manipulated variable measuring unit for measuring values of manipulated variables altered by the driver, including a steering angle measuring device 2, a turn signal control lever 3, an accelerator pedal position measuring device 4, a brake pedal position measuring device 5, and a controller 1. Signals representing values of operated variables altered by the driver and provided by the steering angle measuring device 2, the turn signal control lever 3, the accelerator pedal position measuring device 4, and the brake pedal position measuring device 5 are sent to the controller 1. The driver's intention to change the route can be known from a signal provided by a turn signal controller 3 when the turn signal control lever is operated.

The controller 1 is connected to a navigation system 6 to receive signals from the navigation system 6. Those signals represent a set route, map data, the position of the vehicle on a map, the direction of the vehicle, lane information, such as the number of lanes, speed limit, types of roads, i.e., highways and general motorways, and branch roads. Basically, the route is set by the driver. The navigation system 6 may set or change a route automatically on the basis of past data on traveling routes and traffic information.

The vehicle is provided with an operation parameter measuring unit for measuring values of parameters indicating the operating condition of the vehicle, including wheel speed measuring devices 7fL, 7fR, 7rL and 7rR, and vehicle behavior measuring device 8. Signals provided by those devices are sent to the controller 1. The vehicle behavior measuring device measures longitudinal acceleration, lateral acceleration and yaw rate.

The vehicle is provided with environmental condition measuring devices for measuring conditions of the environment around the vehicle, including a front camera 10f, a front radar 11f, a rear camera 10r, a rear radar 11r, a left front camera 12L, a right front camera 12R, a left rear camera 13L and a right rear camera 13R. Those environmental condition measuring devices send information about lane markings and obstacles around the vehicle to the controller 1.

The front camera 10f is provided with an image pickup unit for obtaining an image of a scenery around the vehicle, a lane identifying unit for identifying lanes on the basis of lane markings or road boundaries shown in an image obtained by the image pickup unit, and an output unit that provides signals representing the positional relation between the vehicle and objects of recognition, such as obstacles including other vehicles and pedestrians, types of lane markings, and types of road boundaries. The lane markings are marks indicating running areas according to traffic rules, including lines, cat's eyes, botts' dots, colors of lines, and types of lines, such as continuous lines, broken lines, dotted lines and shaded lines. Road boundaries include edges of road shoulders, side ditches, curbs, embankments, guard rails and walls. The lane markings indicate boundaries between areas for vehicles and those not for vehicles.

The front radar 11f detects and locates other vehicles and pedestrians and provides signals representing positional relation between the vehicle and those objects. The front radar 11f can detect remote obstacles more accurately than the front camera 10f. The front camera 10f has a detection field angle greater than that of the front radar 11f and can recognize the type of obstacles.

The rear camera 10r, the left front camera 12L, the right front camera 12R, the left rear camera 13L and the right rear camera 13R are similar in functions, advantages and disadvantages to the front camera 10f, and the front radar 11f and the rear radar 11r are similar in functions, advantages and disadvantages.

The vehicle is provided with an engine 21, an electronically controlled brake system 22, an electronically controlled differential mechanism 23, and an electronically controlled steering system 24. The controller 1 gives drive signals to actuators included in those systems 22, 23 and 24 on the basis of values of manipulated variables given by the driver and environmental conditions. When the vehicle needs to be accelerated, the controller 1 gives an acceleration signal to the engine 21. When the vehicle needs to be decelerated, the controller gives a deceleration signal to the electronically controlled brake system 22. When the vehicle needs to be turned, the controller 1 gives a turn signal to at least one of the electronically controlled brake system 22, the electronically controlled differential mechanism 23 and the electronically controlled steering system 24.

The electronically controlled brake system 22 is a hydraulic brake system capable of controlling individual braking forces respectively applied to the wheels. The electronically controlled brake system applies braking forces to either the right wheels or the left wheels in response to a turning request to apply a yawing moment to the vehicle.

The electronically controlled differential mechanism 23 drives an electric motor or a clutch to generate a torque difference between the right and the left axle in response to a turning request to apply a yawing moment to the vehicle.

The electronically controlled steering system 24 is, for example, a steer-by-wire steering system capable of correcting the steering angle independently of the turning angle of the steering wheel in response to a turning request to apply a yawing moment to the vehicle.

The vehicle is provided with an information output unit 26. The information output unit 26 displays images, generates sounds and turns on warning lights representing information about supporting operations according to the type of the driving support operation. The information output unit 26 is, for example, a monitor provided with a built-in loud speaker. Plural information output units may be installed in the vehicle.

Figure 2:
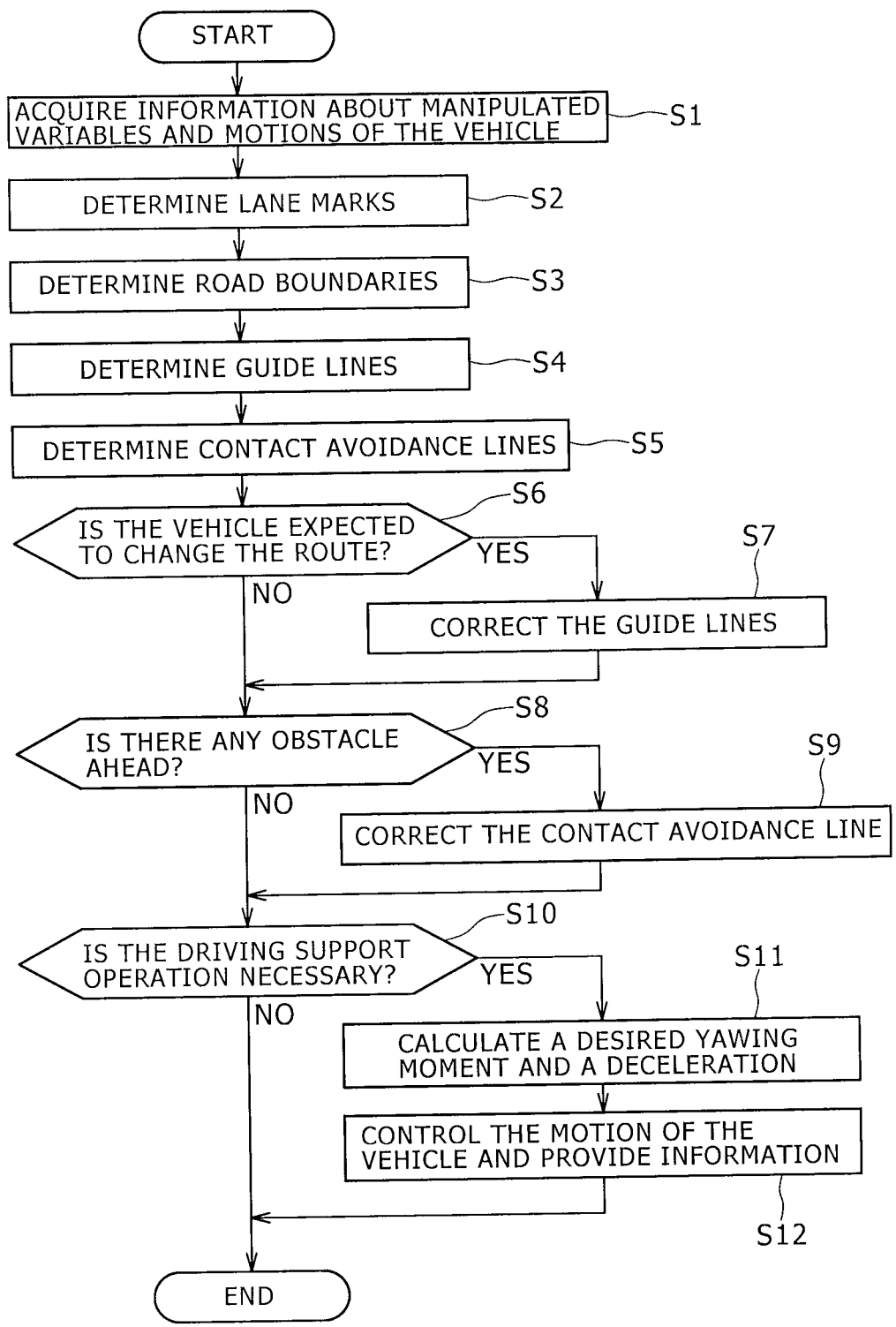
FIG. 2 is a flow chart of a driving support control procedure.
Figure 3:
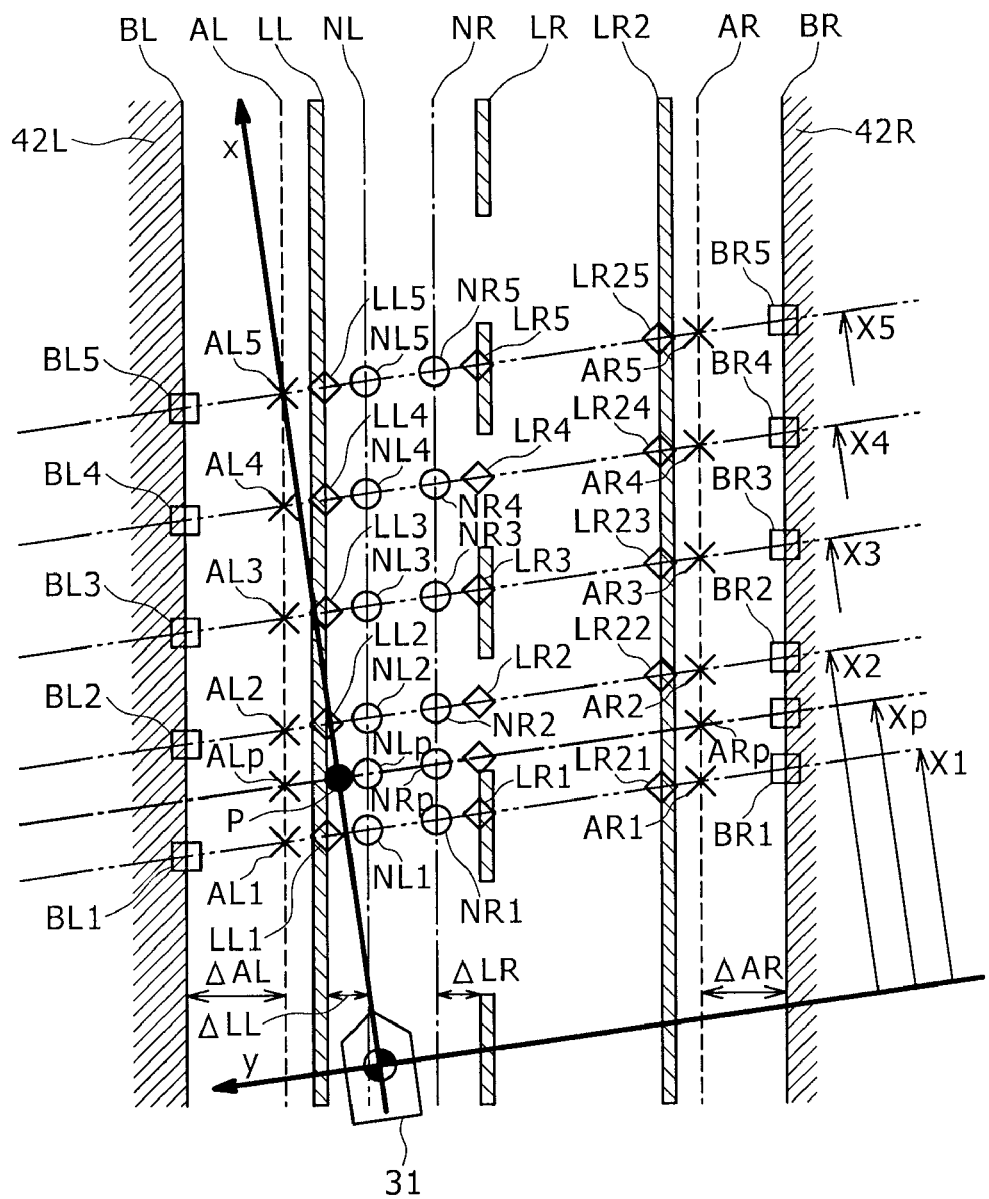
FIG. 3 is a view of assistance in explaining the driving support control procedure when the vehicle is traveling on a straight road.

FIG. 2 is a flow chart of a driving support control procedure and FIG. 3 is a view of assistance in explaining a driving support operation when the vehicle is traveling on a straight road.

The manipulated variable measuring unit receives values of manipulated variables altered by the driver in step s1. That is, the manipulated variable measuring unit receives signals representing a steering angle, the condition of the direction indicator, a movement of the accelerator pedal, a movement of the brake pedal and a set route. The manipulated variable measuring unit receives information about running speed, yaw rate, lateral acceleration and longitudinal acceleration from the measuring devices.

A position at a distance proportional to running speed $V_x$ ahead of the vehicle is selected as a watch point P for control, and the distance is used as a front watch distance $X_p$. A lateral moving distance $Y_p$ by which the vehicle will move is estimated on an assumption that the vehicle arrives at the front watch point P in $t_p$ s. When the vehicle is expected to move laterally, the front watch point P is at a forward distance $X_p$ ahead of the vehicle and a lateral distance $Y_p$ in a lateral direction.

If the steering angle is zero, the vehicle travels a distance equal to $V_x \times t_p$ forward and the lateral distance $Y_p$ is zero. When the lateral acceleration of the vehicle is $a_y$, it is expected the lateral distance $Y_p$ is equal to $a_y \times \Delta t^2 / 2$. Lateral acceleration can be calculated by using an expression: $a_y = V_x \times r$, where r is yaw rate measured by the operation parameter measuring unit or an expression: $a_y = V_x \times f(\delta)$, where $f(\delta)$ is a function expressing the relation between steering angle $\delta$ and yaw rate r. the function can be obtained through analysis using a motion model of a vehicle. The lateral acceleration may be determined by using an accurate analytical expression instead of using the foregoing expressions.

In step s2, the controller 1 determines a right lane marking LR and a left lane marking LL, respectively on the right and on the left side of a straight line (x-axis) passing the center of gravity of the vehicle on the basis of an image formed by the front camera 10f. Since lane markings are formed in most cases on flat roads on which vehicles can travel, the vehicle can continue traveling even if the wheels move on the outer side of a lane marking. The respective distances from the x-axis of left lane markings LL1 to LL5 respectively at distances X1 to X5 ahead of the vehicle are calculated and stored. Positive values on a y-axis are on the left side of the vehicle, distances to the left from the x-axis are positive values, and distances to the right from the x-axis are negative values. Similarly, the respective distances from the x-axis of right lane markings LR1 to LR5 are calculated and stored. When right lane markings LR21 to LR25 of the adjacent lane can be detected, the right lane markings LR21 to LR25 are stored. Type, such as a continuous line or a broken line, the color, such as white, yellow or red, of the lane markings are recognized and stored to determine the degree of danger of crossing the lane marking and the degree of allowance.

In step s3, the controller 1 determines the respective positions of a right road boundary BR and a left road boundary BL on the right and the left side, respectively, of the x-axis on the basis of an image formed by the front camera 10f. It is comparatively difficult for the vehicle to continue running if the wheel crosses and moves beyond the road boundary. Distances from the x-axis of the positions of right road boundary marks BR1 to BR5 and those of left road boundary marks BL1 to BL5 respectively at distances X1 to X5 ahead of the vehicle are calculated and stored. At the same time, roadside areas 42R and 42L are recognized, and information about the type of the roadside areas 42R and 42L, such as edges of road shoulders, side ditches, curbs, embankments or guard rails, is stored to determine the degree of danger of crossing the road boundary and degree of allowance.

In steps s2 and s3, the lane is recognized on the basis of the image formed by the front camera 10f. Therefore, the driving support system can determine the position of the lane properly and ensures safe, comfortable driving without depending on road information and route information provided by a navigation system or the like. The lane may be recognized on the basis of images formed by the other cameras 10r, 12L, 12R, 13L and 13R. In most cases, the rear camera 10 r is a wide-angle camera disposed with its optical axis inclined downward. Therefore, the type of the lane can be more accurately recognized when the rear camera 10r is used for recognizing the lane markings and road boundary marks defining the lane.

In step s4, the controller 1 determines a desired path or a desired running area to guide the vehicle into a route in the vicinity of the center of the lane or into a route that will scarcely give the driver a feeling of discomfort. The desired route or the desired running area is defined by guide lines, namely, first guide lines, NR and NL, namely, right and left thresholds for the driving support control. While the vehicle is in an area between the first lines NR and NL, preference is given to the operations of the driver and is a dead zone for control. A lane is a running area demarcated by lane markings or road boundary marks. When a right lane marking LR and a left lane marking LL are marked on the road, an area between the lane markings LR and LL is a running area. When a right lane marking LR and a left lane marking LL are not marked on the road, and area between the right road boundary BR and a left road boundary BL is a running area. When lane markings LR and LL are not marked intermittently and imaginary lane markings LR and LL can be supposed in intervals between the lane markings LR and LL through interpolation using the adjacent lane markings, and area between the imaginary lane markings are assumed to be a lane. When lane markings are marked on one of the opposite sides of a road, an area between the lane markings and the road boundary on the other side is a lane. The positions of left guide lines NL1 to NL5 respectively at distances X1 to X5 ahead of the vehicle can be determined by subtracting a predetermined value ΔLL from or adding the same to the respective positions of the left lane markings LL1 to LL5. The positions of right guide lines NR1 to NR5 can be determined by subtracting a predetermined value ΔLR from or adding the same to the respective positions of the right lane markings LR1 to LR5.

In step s5, the controller 1 determines right and left contact avoidance lines AR and AL, namely, second lines, to avoid contact by moving the vehicle away from the road boundary. The positions of left contact avoidance lines AL1 to AL5 respectively at distances X1 to X5 ahead of the vehicle are determined by subtracting an avoidance allowance ΔAL from the positions of the left road boundary marks BL1 to BL5. The positions of right contact avoidance lines AR1 to AR5 respectively are determined by adding an avoidance allowance AAR to the positions of the right road boundary marks BR1 to BR5. The avoidance allowances ΔAL and ΔAR are determined taking into consideration the avoidance ability of the vehicle and taking into consideration at least one of factors including the longitudinal speed $V_x$ of the vehicle, the lateral speed $V_y$ of the vehicle, avoidance line approach speed $V_{ya}$, longitudinal acceleration $a_x$, lateral acceleration $a_y$, overall width $v_w$, overall length $v_l$, tread d, wheelbase L, a maximum yawing moment $M_{max}$ that can be applied to the vehicle, a maximum deceleration $a_{xmax}$ that can be achieved by the vehicle, a maximum lateral acceleration $a_{ymax}$ that can be achieved by the vehicle, friction coefficient μ indicating the frictional property of the road surface, the slope θ of the road, the radius R of the curve, a distance and an angle that permit lane detection, and a distance and an angle that permit obstacle detection.

When the highest one of yawing moments that can be generated by the actuator is a maximum yawing moment $M_{max}$, the maximum lateral $a_{ymax}$ is calculated by using an expression: $a_{ymax}=G \times M_{max}$. A distance $\Delta Y_{max}$ that will be traveled by the vehicle approaching the contact avoidance line at a lateral speed $V_{ya}$ and accelerated at the maximum lateral acceleration $a_{ymax}$ before the lateral speed $V_{ya}$ decreases to zero can be calculated by using an expression: $\Delta Y_{max}=V_{ya}^2/(2 \times a_{amax})$. To ensure avoiding contact with the road boundary, an inequality $\Delta AL > \Delta Y_{max}$ is satisfied to lighten damage resulting from contact, an inequality $\Delta AL \leq \Delta Y_{max}$ is satisfied.

The maximum yawing moment $M_{max}$ is reduced and corrected according to the values of controlled variables representing motions of the vehicle with respect to the guide lines NR and NL, because a yawing moment is generated by guiding control at the start of a control operation for controlling the motion of the vehicle for contact avoidance and a limited additional yawing moment is available for contact avoidance. Therefore, a desired yawing moment at the start of the contact avoidance control is subtracted for correction from the maximum yawing moment $M_{max}$ that can be applied to the vehicle. Since the reduction of the contact avoiding ability of the vehicle by driving support by the first line can be thus taken into consideration and hence the safety of the driving support system can be enhanced.

In step s6, lane change is predicted from route information provided by the navigation system 6 and a signal provided when the driver operates the turn signal control lever 3. When the running vehicle is expected to change the route from the lane in which the vehicle is traveling at present to another lane, positions of the lane markings on a path along which the vehicle runs to change the route and the road boundary are determined, and then a decision is made as to whether or not the guide lines NL and NR need to be corrected. The driving support control procedure goes to step s8 when the vehicle is traveling on a single-lane road and lane change is not expected.

If lane change is expected in step s6, a guide line correction process is executed in step s7 to correct the guide lines NL and NR on the basis of the route information. The guide line correcting process will be described later with reference to FIG. 6.

Obstacles on the route are detected in step s8. If an obstacle is detected, a decision is made in step s9 as to whether or not the right contact avoidance line AR and the left contact avoidance line AL need to be corrected. If any obstacle is not detected, the procedure goes to step s10. A contact avoidance line correction process is executed to correct the contact avoidance lines AR and AL on the basis of information about obstacles. The contact line correction process will be described later with reference to FIG. 5.

Positions of guide lines $NR_p$ and $NL_p$ at a front watch distance $X_p$ are determined by interpolation using five right guide lines NR1 to NR5 and five left guide lines NL1 to NL5. Positions of contact avoidance lines $AR_p$ and $AL_p$ at a front watch distance $X_p$ are determined by interpolation using five right contact avoidance lines AR1 to AR5 and left contact avoidance lines AL1 to AL5. A decision is made in step s10 as to whether or not the driving support operation needs to be executed on the basis of the guide lines $NR_p$ and $NL_p$ and the contact avoidance lines $AR_p$ and $AL_p$. If the front watch point P is on the inner side of the guide lines $NR_p$ and $NL_p$ and on the inner side of the contact avoidance lines $AR_p$ and $AL_p$, the driving support operation is not executed and the driving support control procedure is ended. If the front watch point P is on the outer side of the guide line $NR_p$ or $NL_p$ or on the outer side of the contact avoidance line $AR_p$ or $AL_p$, it is decided that the driving support control operations need to be executed and step s11 is executed. In FIG. 3, the front watch point P is on the outer side of the left guide line $NL_p$, i.e., on the left side of the left guide line $NL_p$, and hence the driving support control procedure is executed.

If the front watch point P is on the outer side of the guide line $NL_p$ or $NR_p$, a desired yawing moment for guiding to a position on the inner side of the guide line $NL_p$ or $NR_p$ is calculated in step s11. To place importance on mitigating a feeling of discomfort felt by the driver, the driving support operation with reference to the guide line provides actuator selection information for selecting actuators to generate a yawing moment by the agency of the electronically controlled differential mechanism 23 and the electronically controlled steering system 24 instead of by the agency of the electronically controlled brake system 22 that decelerates the vehicle.

If the front watch point P is on the outer side of the contact avoidance line $AR_p$ or $AL_p$, a desired yawing moment and a desired deceleration for moving the vehicle into an area between the contact avoidance line AR and AL are calculated. To place importance on preventing the vehicle 31 from running on the outer side of the road boundary and avoiding contact of the vehicle with an obstacle, a yawing moment and a deceleration are generated by the agency of the electronically controlled brake system 22 in addition to a yawing moment generated by the agency of the electronically controlled differential mechanism 23 and the electronically controlled steering system 24. If the right and the left contact avoidance line intersect each other, it is decided that contact cannot be avoided by a turning motion and a desired deceleration necessary for stopping the vehicle is calculated.

Figure 4:
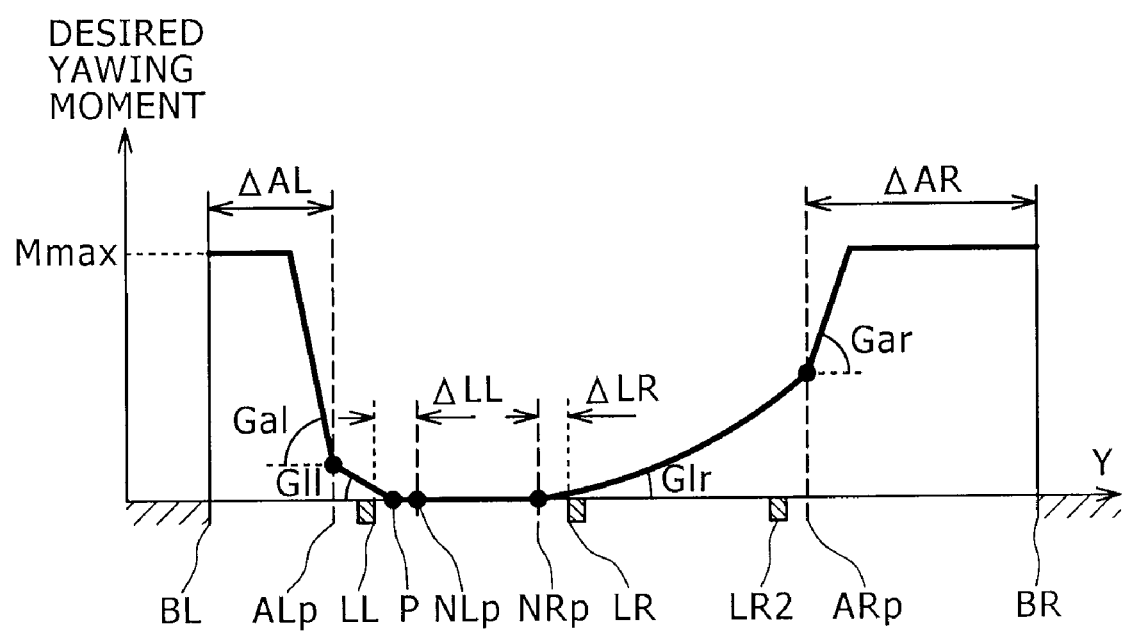
FIG. 4 is a diagrammatic view of a position $X_p$ in FIG. 3.

FIG. 4 is a view of a position $X_p$ in FIG. 3. FIG. 4 shows the positional relation of the lane markings LL, LR and LR2, the road boundaries BL and BR, the guide lines $NL_p$ and $NR_p$, and the contact avoidance lines $AL_p$ and $AR_p$, and the relation of the absolute value of the desired yawing moment. A driving support operation makes the vehicle yaw smoothly and gives the driver a light feeling of discomfort when the gradient $Gl_l$ (control gain) of a yawing moment increasing from the guide line $NL_p$ toward the contact avoidance line $AL_p$ and the gradient $Gl_r$ (control gain) of a yawing moment increasing from the guide line $NR_p$ toward the contact avoidance line $AR_p$ are small. The distance between the right contact avoidance line AR and the left contact avoidance line AL can be increased when an area in which a limit ability of motions of the vehicle (the maximum yawing moment $M_{max}$) is generated is increased by increasing the gradients $Ga_r$ or $Ga_l$ of yawing moment increasing after the vehicle has crossed the contact avoidance line outward. Thus the frequency of the support operation for contact avoidance can be reduced and a nuisance to the driver can be mitigated. The sharp change of the motion of the vehicle during the contact avoidance control operation can call drivers attention.

The car can be controlled so as to perform desired motions by using the control gains $Gl_l$ and $Gl_r$ dependent on the positional relation between the vehicle and the guide lines NR and NL, and the control gains $Ga_r$ and $Ga_l$ dependent on the positional relation between the contact avoidance lines AR and AL. Therefore, the driver can readily understand objects of driving support operations and an effect on mitigating a feeling of discomfort can be expected. Since the control variables can be selectively set according to objects, control operations can be easily tuned in designing the driving support system.

The gradient of a yawing moment increasing from the guide line toward the contact avoidance line is determined selectively according to the type of the lane marking. For example, a yawing moment increasing at a comparatively low gradient is used when the lane marking LR indicating the boundary between the adjacent lanes is a broken line, and a yawing moment increasing at a comparatively high gradient is used when the lane marking LR indicating the boundary between the adjacent lanes is a continuous line. Since the effect of a driving support operation using a yawing moment having such a gradient agrees with the degree of driver's consciousness when the driver is trying to keep the vehicle in the lane, the driving support system can still more effectively mitigate a feeling of discomfort. The lane marking LL on the side of the road boundary on most roads is a continuous line. Therefore, when a comparatively high gradient is used for indicating the slop of a yawing moment increasing toward a continuous line, the driving support system can still more effectively mitigate a feeling of discomfort because the effect of a driving support operation using a yawing moment having such a comparatively high gradient agrees with the degree of driver's consciousness when the driver is trying to move the vehicle away from the road boundary. It is highly possible that the vehicle is traveling on a road having three lanes on each of its sides when both the lane markings on the opposite sides of the lane are broken lines. In Japan, it is highly possible that a lane on the right side of a lane in which the vehicle is traveling and adjacent to the lane in which the vehicle is traveling is a passing lane. In such a case, a driving support operation agrees with the degree of driver's consciousness when the driver is trying to avoid contacting with a vehicle approaching the driver's vehicle from behind when the driving support operation uses a yawing moment increasing toward the passing lane and having a comparatively high gradient. Thus the driving support system can still more safely support driving operations and can still more effectively mitigate a feeling of discomfort.

The controller 1 executes a driving support control operation in step s12. The controller 1 uses at least one of the electronically controlled differential mechanism 23, the electronically controlled steering system 24 and the electronically controlled brake system 22 for controlling the motion of the vehicle to apply a desired yawing moment to the vehicle and to decelerate the vehicle at a desired deceleration or the controller 1 prompts the driver to correct driving operations by driving the information output unit 26 so as to display a warning, to generate a warning or to turn on a warning light. Then, the driving support control procedure is ended.

Figure 5:
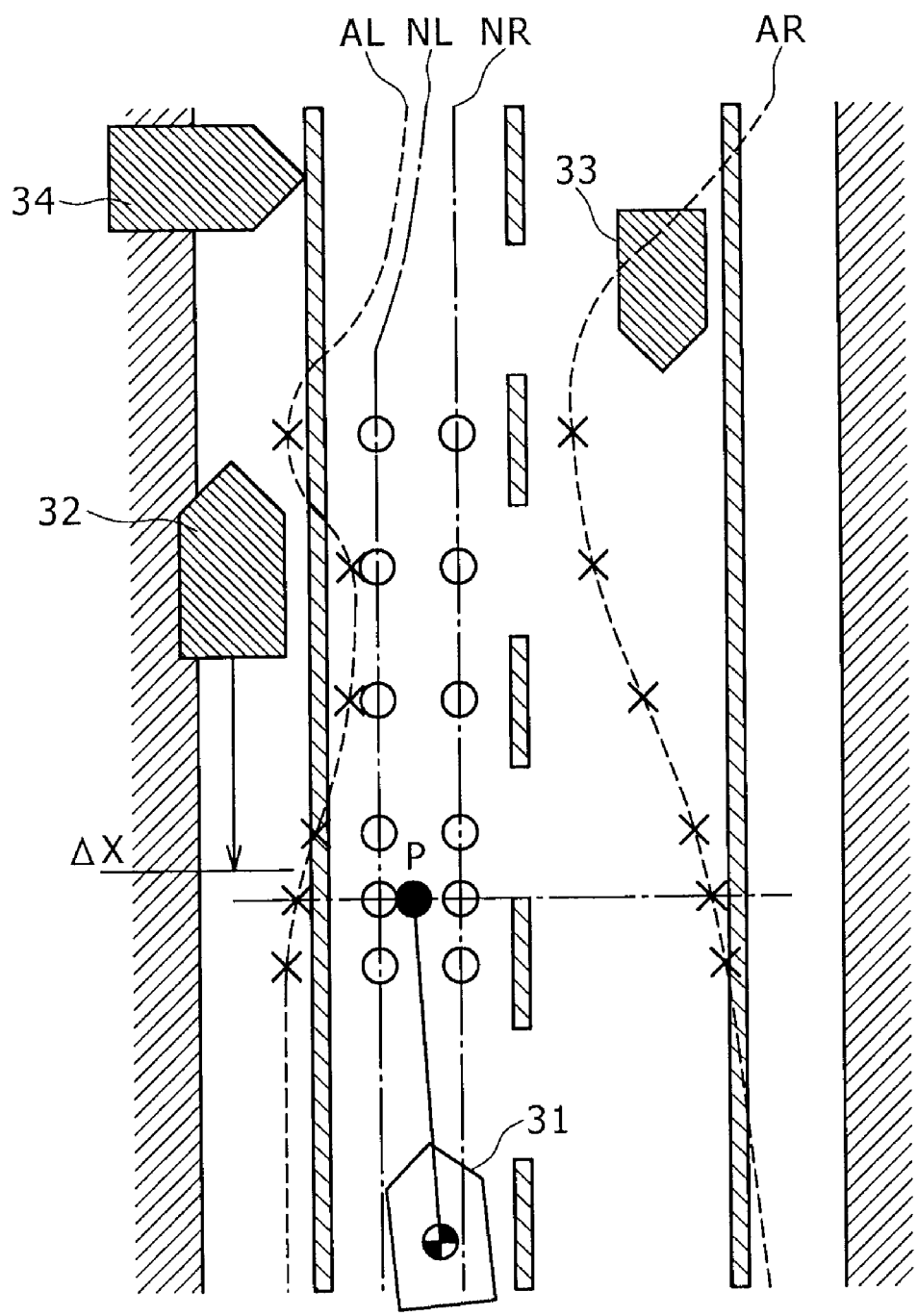
FIG. 5 is a view of assistance in explaining operations when an obstacle exists on a straight road.

FIG. 5 is a view of assistance in explaining contact avoidance operations when an obstacle exists on a straight road.

When an obstacle is detected in step s8, the contact avoidance line AR or AL is shifted inward in step s9. In a case shown in FIG. 5 where a vehicle 32 parking on the road shoulder is detected, the left contact avoidance line AL is shifted to the right to determine a corrected left contact avoidance line. The corrected contact avoidance line is determined taking the contact avoidance ability of the vehicle into consideration. The position of the corrected left contact avoidance line is determined taking into consideration at least one of factors including the longitudinal speed $V_x$ of the vehicle, the lateral speed $V_y$ of the vehicle, avoidance line approach speed $V_{ya}$, longitudinal acceleration $a_x$, lateral acceleration $a_y$, overall width $v_w$, overall length $v_l$, tread d, wheelbase L, a maximum yawing moment $M_{max}$ that can be applied to the vehicle, a maximum deceleration $a_{xmax}$ that can be achieved by the vehicle, a maximum lateral acceleration $a_{ymax}$ that can be achieved by the vehicle, friction coefficient μ indicating the frictional property of the road surface, the slope θ of the road, the radius R of the curve, a distance and an angle that permit lane detection, and a distance and an angle that permit obstacle detection.

When the actuator can generate the maximum yawing moment $M_{max}$, the maximum lateral acceleration $a_{ymax}$ is calculated by using an expression: $a_{ymax}=G \times M_{max}$. A distance ΔX to be traveled by the vehicle running forward at a forward velocity $V_x$ toward the obstacle and laterally accelerated at a lateral acceleration $\pm a_{ymax}$ to avoid contact with the obstacle before the lateral speed of the vehicle drops to zero is calculated by using an expression: $\Delta X = V_x \times \sqrt{\Delta Y / a_{ymax}}$. The maximum lateral acceleration $\pm a_{ymax}$ may be corrected according to the friction constant μ representing the frictional property of the road surface, the slop θ of the road and the radius R of the curve.

To avoid surely the contact of the vehicle with the obstacle, a contact avoidance operation for shifting the contact avoidance line AL to the right is started at a position on the side of the vehicle at a distance equal to or longer than the distance ΔX. The corrected left contact avoidance line has the shape of a combination of parabolic lines, provided that lateral movement is made at the maximum lateral acceleration $a_{ymax}$. The corrected left contact avoidance line may have any shape, provided that the corrected left contact avoidance line can ensure the avoidance of contact between the vehicle and the obstacle. The contact avoidance operation for shifting the contact avoidance line AL to the right may be started at a position on the side of the vehicle at a distance not longer than the distance ΔX if contact between the vehicle and the obstacle is permitted and the object of the contact avoidance operation is to reduce damage to the vehicle.

If an opposing vehicle 33 is traveling in an opposing lane as shown in FIG. 5, the right contact avoidance line AR is shifted to the left. A contact avoidance operation for shifting the right contact avoidance line AR to the left is similar to the contact avoidance operation for shifting the left contact avoidance line AL to the right to avoid contact between the vehicle and the other vehicle 32 parking on the left road shoulder. However, since the relative speed of the vehicle with respect to the opposing vehicle 33 is high, the contact avoidance operation is started earlier at a longer distance on the side of the vehicle from the opposing vehicle 33. If a danger, such as the meandering of the opposing vehicle 33, is expected, the right contact avoidance line AR may be further shifted to the left.

When the two types of reference lines, namely, the guide lines NR and NL, and the contact avoidance lines AR and AL, are used for driving support operations, the contact avoidance lines AR and AL can be corrected with the guide lines NR and NL fixed. Thus the driving support operation can be executed without making the driver feel a feeling of discomfort when there is no danger of contact between the vehicle and the obstacle, and the driving support operation to avoid contact between the vehicle and the obstacle can be achieved.

When the contact avoidance line AL or AR is corrected, the guide line NL or NR is corrected again so that the guide line NL or NR is on the inner side of the contact avoidance line AL or AR to carry out the driving support operation safely and to mitigate a feeling of discomfort that may be given to the driver by the driving support operation. When an obstacle 34, namely, a vehicle, shown in FIG. 5, is detected and the contact avoidance line AL is shifted to the right so as to be on the inner side of the guide line NL, the guide line NL is corrected again so as to be on the inner side of the contact avoidance line AL. Since an ordinary guiding support operation can started even in a state where contact avoidance is expected, the driving support operation can be smoothly carried out scarcely giving the driver a feeling of discomfort.

FIG. 6 is a view of assistance in explaining operations to be executed when a route is changed to move a vehicle 31 into a branch road.

Figures 6A, 6B:
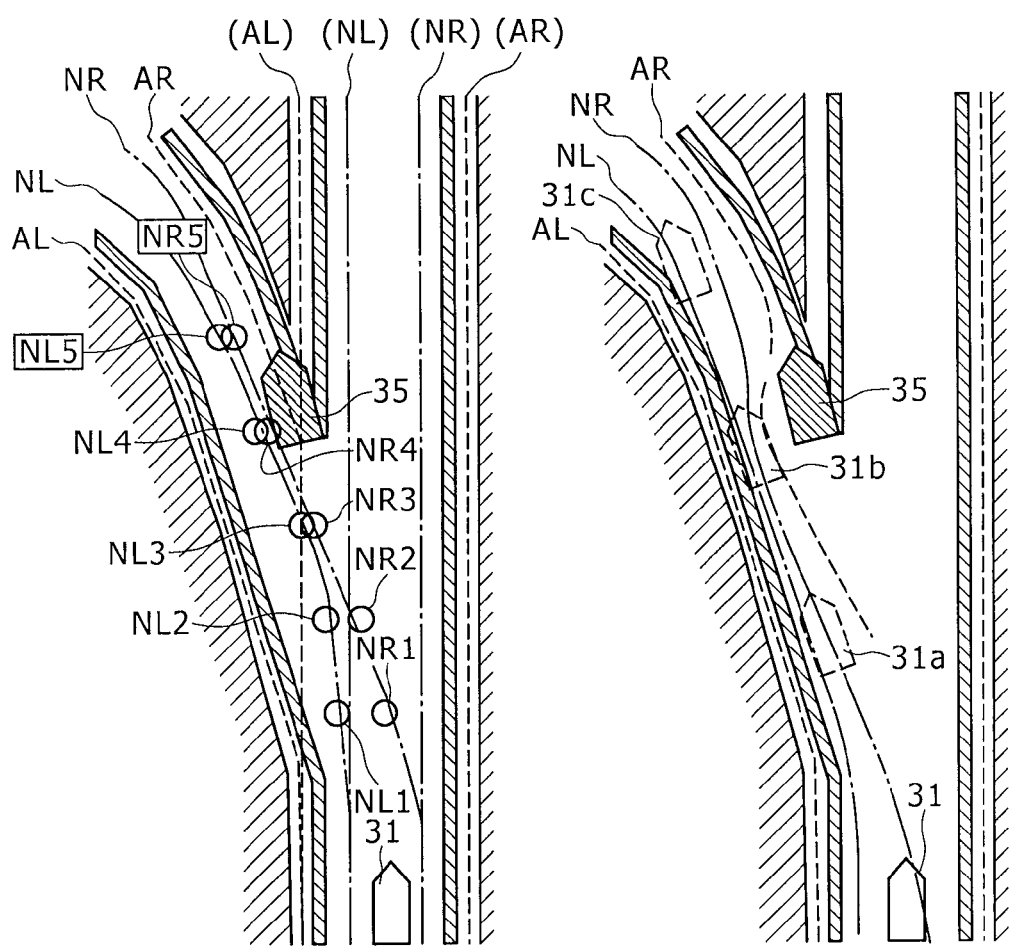
FIG. 6 is a view of assistance in explaining operations to be executed when a route is changed for a vehicle to move into a branch road.

A correcting process for correcting the guide line NL or NR or the contact avoidance line AL or AR is executed in step s7 on the basis of information about the route when it is decided in step s6 that the route is to be changed. When it is decided that the route along which the vehicle 31 is traveling at present is changed for a branch route branching from the lane in which the vehicle 31 is traveling at present as shown in FIG. 6A, operations similar to those executed in steps s3 to s5 are executed on the basis of an image formed by the front camera 10f. Respective positions of left lane markings LL1 to LL5, right lane markings LR1 to LR5, left road boundaries BL1 to BL5, right road boundaries BR1 to BR5, left guide lines NL1 to NL5, right lane markings NR1 to NR5, left contact avoidance lines AL1 to AL5, and right contact avoidance lines AR1 to AR5 on expected route are determined. Only the guide lines NL1 to NL5 and NR1 to NR5 are shown in FIG. 6A. The positions of the lane markings before correction determined in step s2 are stored to respond quickly to the future route change.

A driving support operation for supporting operations for changing the route uses the right and the left guide line spaced apart by a distance shorter than those used for controlling the operation for guiding the vehicle 31 within the lane. The width of a space between the left guide lines NL1 to NL5 and the right guide lines NR1 to NR5 is equal to or smaller than the overall width $v_w$ of the vehicle 31. Thus the length of a running section in which the motion of the vehicle 31 is controlled positively increased, so that support operation ensures a smooth route changing operation. For example, it is possible that the vehicle 31 meanders if the right and the left guide line are spaced wide apart. Such possibility can be suppressed by using the right and the left guide line extended at a short distance from each other. After step s7 has been completed, operations for controlling the vehicle 31 in a state where an obstacle is on the route is executed in step s8.

In step s8, an obstacle on an estimated route is detected and a decision is made as to whether or not the correction of the contact avoidance lines AL and AR is necessary. The procedure goes to step s9 if an obstacle 35, such as a parking vehicle shown in FIG. 6, which can be a danger to the vehicle 31 is detected. Then, the contact avoidance lines AL and AR are corrected so that the vehicle 31 may not come into contact with the obstacle 35.

The contact avoidance line AR is shifted inward as shown in FIG. 6B in step s9. This correction is made by a method similar to that mentioned above. The guide lines NL and NR are corrected again such that the guide line NR is on the inner side of the contact avoidance line AR when the contact avoidance line AR is shifted to a position on the inner side of the guide line NR. Since a usual control operation for supporting guiding is started first even in a state where contact avoidance can be expected, the driving support operation can be achieved safely scarcely giving the driver a feeling of discomfort.

Figure 7:
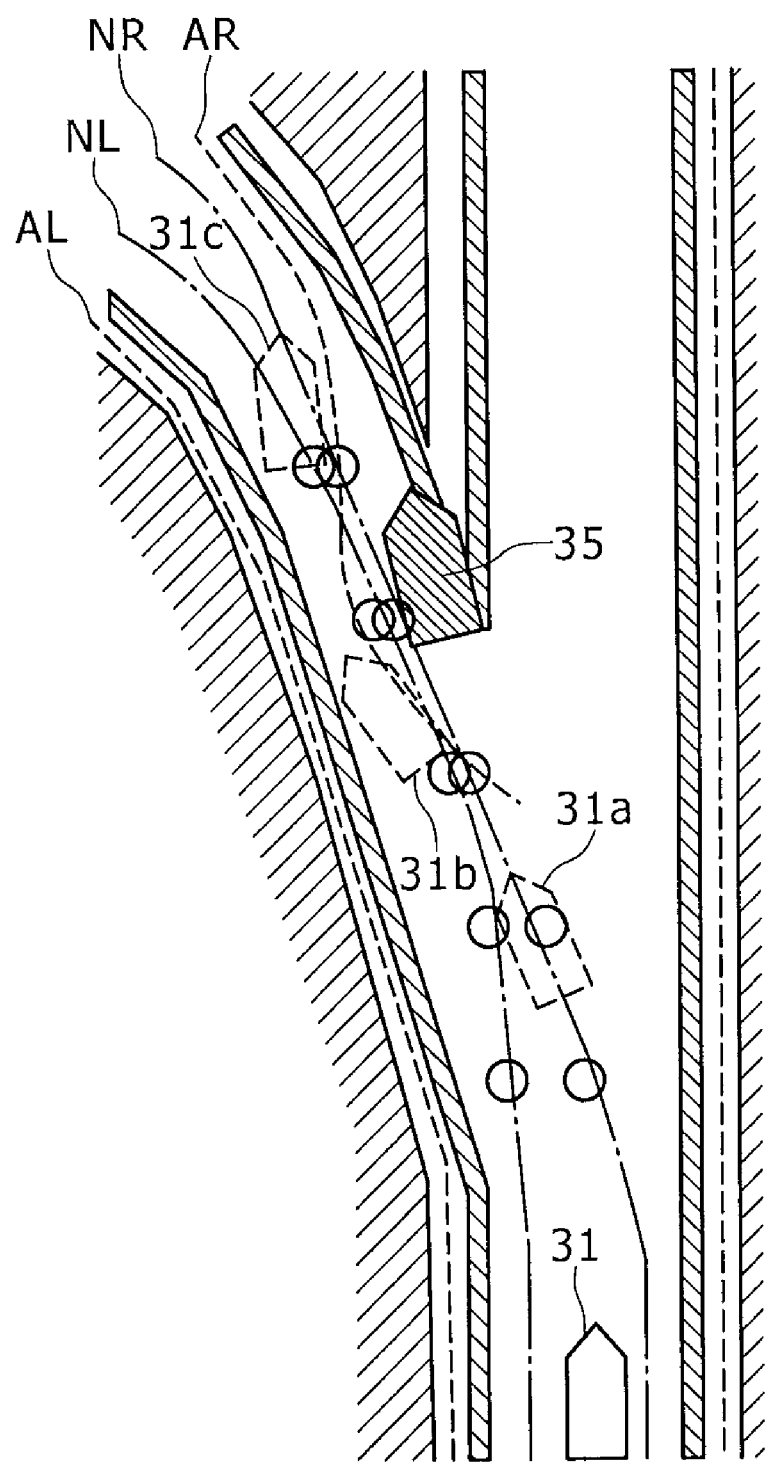
FIG. 7 is a view of assistance in explaining an obstacle avoidance support operation to be executed when an obstacle is detected after a route has been changed.

The driving support operation for this correction taking both route change and contact avoidance into consideration can be started while the vehicle 31 is in the lane in which the vehicle 31 is traveling at present. Therefore, contact avoidance operations for preventing the vehicle 31 from coming into contact with the obstacle 35 can be started when the vehicle 31 is at a position shown in FIG. 6B. Therefore, a sufficient time can be used for controlling the vehicle 31 so that the vehicle 31 can smoothly avoid coming into contact with the obstacle 35. Consequently, the vehicle 31 can be smoothly guided so as to travel along a route passing positions 31a to 31c. FIG. 7 shows a route passing positions 31a to 31c along which the vehicle 31 will travel when the avoidance support operation is started upon the detection of the obstacle 35 after the route has been changed. Since the contact avoidance line AR is corrected after the vehicle 31 has arrived at the position 31b, it is possible that the vehicle needs to make a sharp turn and meanders.

FIG. 8 is a view of assistance in explaining a driving support operation to be executed when the vehicle 31 moves from a lane in which the vehicle 31 is traveling at present to an expected lane adjacent to the former.

A correcting process for correcting the guide lines NL and NR and the contact avoidance lines AL and AR is executed in step s7 on the basis of information about the route when it is decided in step s6 that the route is to be changed. Lane change to a lane adjacent to the lane in which the vehicle 31 is traveling at present can be known from information about the operation of the turn signal control lever 3. When it is decided that the vehicle 31 is going to move from the lane in which the vehicle 31 is traveling at present into a lane adjacent to the former as shown in FIG. 8A, operations similar to those executed in steps s3 to s5 are executed on the basis of an image formed by the front camera 10f to determine the respective positions of the right guide line NR, the left guide line NL, the right contact avoidance line AR and the left contact avoidance line AL. In FIG. 8A, (NL), (NR) and (AR) indicate the guide lines NL and NR and the contact avoidance line AR, respectively.

It is decided in step s8 that the contact avoidance lines AR and AL need to be corrected when an obstacle in an expected lane is detected. Obstacles around the vehicle 31 are detected in addition to the obstacle in front of the vehicle 31 by using the rear camera 10r, the rear radar 11r, the left front camera 12L, the right front camera 12R, the left rear camera 13L and the right rear camera 13R. When an obstacle 36 shown in FIG. 8 with which the vehicle 31 may possibly come into contact is detected, the contact avoidance lines AL and AR are corrected so as to avoid contact between the vehicle 31 and the obstacle 36 in step s9. The guide line NR is corrected again so as to be on the inner side of the contact avoidance line AR when the corrected contact avoidance line AR is on the inner side of the guide line NR. Since a usual control operation for supporting guiding is started first even in a state where contact avoidance can be expected, the driving support operation can be achieved safely scarcely giving the driver a feeling of discomfort.

The driving support operation for this correction taking both route change and contact avoidance into consideration can be started while the vehicle 31 is in the lane in which the vehicle 31 is traveling at present. Therefore, guiding operations for guiding the vehicle 31 into the expected lane taking an obstacle into consideration can be stated when the vehicle 31 is at a position shown in FIG. 9 before the vehicle 31 starts changing the route. Consequently, the vehicle 31 can be smoothly guided along a route passing positions 31a to 31c to the expected lane. FIG. 8B shows a route passing positions 31a to 31c along which the vehicle 31 will travel when the avoidance support operation is started upon the detection of the obstacle 35 after the route has been changed. Since the contact avoidance line AR is corrected after the vehicle 31 has arrived at the position 31a, it is possible that the vehicle needs to make a sharp turn and meanders.

Figure 9:
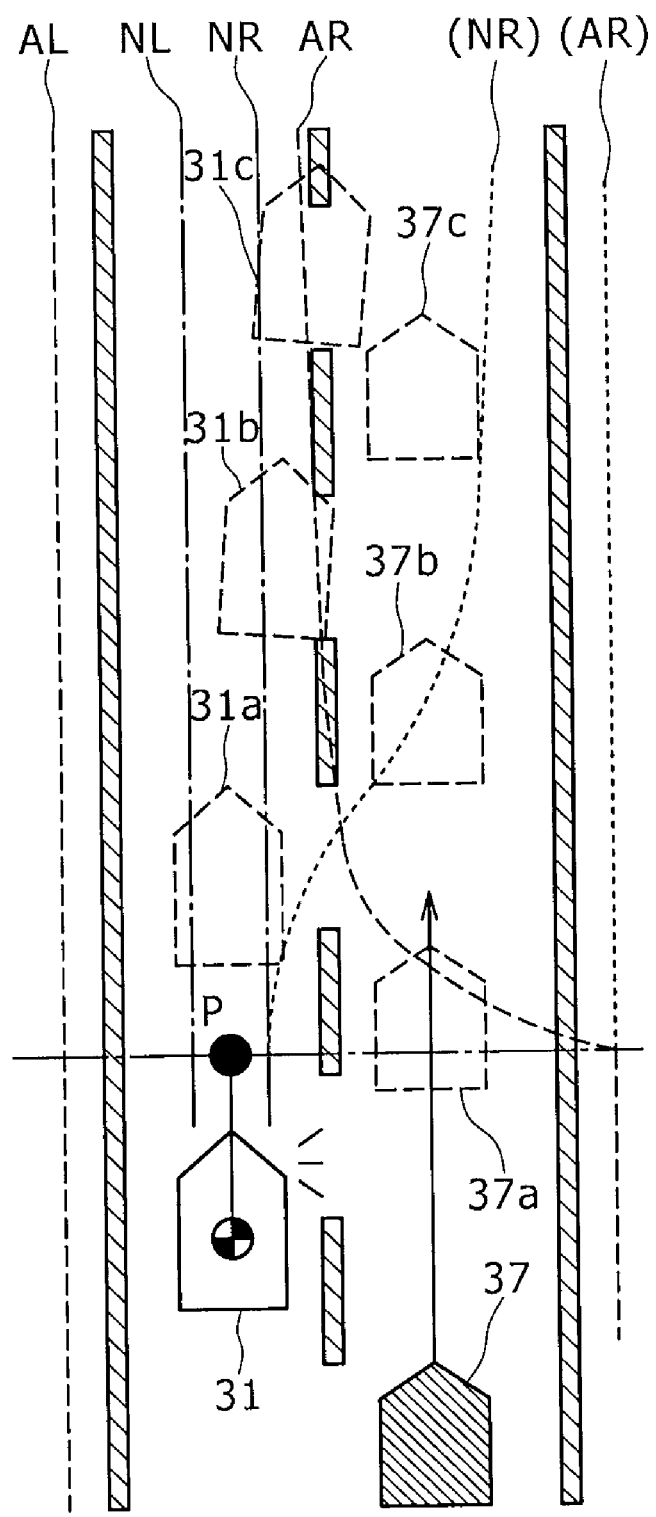
FIG. 9 is a view of assistance in explaining another driving support operation to be executed when the route is changed for movement into an adjacent lane.

FIG. 9 is a view of assistance in explaining another driving support operation to be executed when the vehicle 31 moves from a lane in which the vehicle 31 is traveling at present to an expected lane adjacent to the former.

This driving support operation does not execute positive guidance like that mentioned in connection with FIG. 8. The driver performs a steering operation to change the route and the driving support operation executes a control operation to retard a route changing operation only when there is an obstacle with which the vehicle 31 may possibly come into contact.

A correcting process for correcting the guide lines NL and NR and the contact avoidance lines AL and AR is executed in step s7 on the basis of information about the route when it is decided in step s6 that the route is to be changed. Lane change to a lane adjacent to the lane in which the vehicle 31 is traveling at present can be known from information about the operation of the turn signal control lever 3. When it is decided that the vehicle 31 is going to move from the lane in which the vehicle 31 is traveling at present into a lane adjacent to the former as shown in FIG. 9, the position of the right guide line NR is corrected on the basis of an image formed by the front camera 10f so that a route changing operation may not be obstructed. In FIG. 9, (NR) and (AR) indicate the guide line NR and the contact avoidance line AR, respectively.

It is decided in step s8 that the contact avoidance line AR needs to be corrected when an obstacle in an expected lane is detected. Obstacles around the vehicle 31 are detected in addition to an obstacle in front of the vehicle 31 by using the rear camera 10r, the rear radar 11r, the right front camera 12R and the right rear camera 13R. When a vehicle 37 approaching the vehicle 31 from behind as shown in FIG. 9 is detected, the contact avoidance line AR is corrected so as to avoid contact between the vehicle 31 and the vehicle 37 in step s9. The guide line NR is corrected again so as to be on the inner side of the contact avoidance line AR when the corrected contact avoidance line AR is on the inner side of the guide line NR. Since the route changing operation can be retarded in a state where a guiding support operation is being controlled even in a state where contact avoidance can be expected, the driving support operation can be achieved safely scarcely giving the driver a feeling of discomfort.

The driver is warned of danger by a warning sound a warning light and/or a warning image immediately after the turn signal control lever has been operated. The warning sound given immediately after the operation of the turn signal control lever 3 when the vehicle 31 is at a position 31a shown in FIG. 9 is a single sound pulse to reduce a nuisance to the driver. The motion of the vehicle is not controlled immediately after the operation of the turn signal control lever 3 because the vehicle has not gone outside either of the guide line NR and the contact avoidance line AR immediately after the operation of the turn signal control lever 3. When the vehicle 31 moves outside the guide line NR or the contact avoidance line AR according to a driver's operation to a position 31b shown in FIG. 9, the motion of the vehicle 31 is controlled so as to return the vehicle 31 to the lane in which the vehicle 31 has been traveling and the driver is informed of danger by a more readily perceivable warning sound, a more conspicuous warning image and/or a more clearly perceptible warning light. When the vehicle 31 has passed the contact avoidance line AR to a position 31c shown in FIG. 9, in particular, it is highly possible that the vehicle 31 comes into contact with the vehicle 37 approaching the vehicle 31 from behind. Therefore, the perceptibility of the warning sound, the warning image and the warning light is enhanced.

The driving support system in this embodiment performs driving support operations on the basis of the positional relation between the vehicle and the guide lines (first lines) or the contact avoidance lines (second lines). Reference lines for driving support operations are not limited to the guide lines and the contact avoidance lines. For example, the contact avoidance lines may be those that allow the vehicle to come into contact with an obstacle in a low degree and those that do not permit contact at all and enable using a sufficient time for controlling the vehicle so that the vehicle can smoothly avoid coming into contact with an obstacle. Expected damage that may be caused by an obstacle is estimated on the basis of the type of the obstacle, and the two types of contact avoidance lines may be selectively used to achieve a safe driving support operation scarcely giving the driver a feeling of discomfort. Two types of guide lines may be selectively used to use different control gains selectively. Since the effect of control can be thus adjusted according to the object of guiding, the driving support system will give the driver a less feeling of discomfort. Guide lines and contact avoidance lines may be generated according to circumstances to carry out the driving support operation in three or more modes. Thus, a highly expandable driving support system that will scarcely give the driver a feeling of discomfort can be provided.

Although the driving support system in the preferred embodiment has been described as applied to controlling motions of a vehicle during rout change from the lane in which the vehicle is traveling at present to the branch lane and from the lane in which the vehicle is traveling at present to the lane adjacent to the lane in which the vehicle is traveling at present, the present invention is applicable to controlling a vehicle in various traveling modes including those for running into the junction of roads, for passing a crossroad, selecting a gate of a tollgate lane change to a right-turn lane and lane change to a left-turn lane. When the driving support system is expanded to cope with those expected traveling modes, the driving support system will ensure safer traveling and scarcely give the driver a feeling of discomfort.

What is claimed is:

1. A driving support system comprising:
at least one camera for detecting lanes around a vehicle;
an obstacle detecting unit for detecting an obstacle obstructing progress of the vehicle;
a control device configured to correct guide lines, based on the obstacle obstructing progress of the vehicle, after the guide lines, which guide progression of the vehicle, have been recognized by the lane detecting unit, guide control the vehicle on the basis of a positional relation between the corrected guide lines determined by the correcting unit and the vehicle, and, when it is decided that the vehicle changes its route from a present lane, in which the vehicle is traveling at present, to another lane, and when an obstacle is detected on the other lane, set contact avoidance lines to avoid contact with the obstacle on the other lane from a traveling position of the present lane, correct the guide lines again so that the guide lines become inside of the contact avoidance lines, and set a control gain so that an increase in incline of yawing moment is greater at locations outside of the contact avoidance lines than at locations inside of the contact avoidance lines and outside of the guide lines.

2. The driving support system according to claim 1, wherein the at least one camera forms images of matters around the vehicle and recognizes lanes by images of lane markings or road boundaries formed by the at least one camera.

* * * * *